United States Patent
Kelly (10) Patent No.: US 9,434,291 B2
(45) Date of Patent: Sep. 6, 2016

(54) METHOD AND APPARATUS FOR TRANSPORTING WIND TURBINE BLADES

(75) Inventor: Thomas P. Kelly, Fort Worth, TX (US)

(73) Assignee: BNSF Railway Company, Fort Worth, TX (US)

( * ) Notice: Subject to any disclaimer, the term of this patent is extended or adjusted under 35 U.S.C. 154(b) by 0 days.

(21) Appl. No.: 13/273,991

(22) Filed: Oct. 14, 2011

(65) Prior Publication Data

US 2012/0091080 A1    Apr. 19, 2012

Related U.S. Application Data

(60) Provisional application No. 61/393,404, filed on Oct. 15, 2010.

(51) Int. Cl.
*B65D 88/00* (2006.01)
*B60P 3/40* (2006.01)

(52) U.S. Cl.
CPC ............ *B60P 3/40* (2013.01); *Y10T 29/49764* (2015.01); *Y10T 29/49815* (2015.01); *Y10T 29/49826* (2015.01); *Y10T 29/49947* (2015.01)

(58) Field of Classification Search
USPC ......... 220/1.5, 4.28; 211/60.1; 206/521, 522
See application file for complete search history.

(56) References Cited

U.S. PATENT DOCUMENTS

| 4,671,714 | A | | 6/1987 | Bennett |
| 4,929,132 | A | | 5/1990 | Yeates et al. |
| 5,139,374 | A | | 8/1992 | Holt |
| 5,462,188 | A | * | 10/1995 | Yurgevich ...................... 220/1.5 |
| 5,829,595 | A | * | 11/1998 | Brown et al. .................. 206/600 |
| 6,546,878 | B1 | | 4/2003 | Smith et al. |
| 6,626,619 | B1 | | 9/2003 | Exnowski et al. |
| 6,983,844 | B2 | | 1/2006 | O'Kane et al. |
| 7,210,882 | B2 | | 5/2007 | Andersen et al. |
| 7,303,365 | B2 | | 12/2007 | Wobben |
| 7,568,324 | B2 | * | 8/2009 | Bussey et al. .................... 53/86 |
| 7,591,621 | B1 | | 9/2009 | Landrum |
| 7,670,090 | B1 | | 3/2010 | Landrum |
| 7,744,318 | B2 | | 6/2010 | Wobben |
| 2003/0175089 | A1 | * | 9/2003 | Almind ............................ 410/2 |
| 2005/0123382 | A1 | | 6/2005 | Christensen et al. |
| 2005/0180833 | A1 | | 8/2005 | Almind |
| 2006/0113449 | A1 | | 6/2006 | Nies |
| 2006/0251517 | A1 | | 11/2006 | Grabau |
| 2006/0285937 | A1 | | 12/2006 | Wobben |
| 2007/0145181 | A1 | | 6/2007 | Pedersen |
| 2007/0177954 | A1 | | 8/2007 | Kootstra et al. |
| 2007/0189895 | A1 | | 8/2007 | Kootstra et al. |
| 2007/0248431 | A1 | | 10/2007 | Jensen |
| 2007/0253829 | A1 | | 11/2007 | Wessel et al. |

(Continued)

FOREIGN PATENT DOCUMENTS

CN    2085359    9/1991

OTHER PUBLICATIONS

Non-Final Office Action from counterpart U.S. Appl. No. 13/281,137 dated Jan. 18, 2012.

(Continued)

*Primary Examiner* — Jeffrey Allen
(74) *Attorney, Agent, or Firm* — James E. Walton (57) ABSTRACT

A system for transporting wind turbine blades includes a frame assembly for retaining a set one or more wind turbine blades and a plurality of inflatable devices coupled to the frame assembly.

10 Claims, 6 Drawing Sheets

(56) References Cited

U.S. PATENT DOCUMENTS

2009/0020445 A1\* 1/2009 Koike .......................... 206/319
2009/0032530 A1\* 2/2009 Chu ............................ 220/4.28
2010/0193394 A1\* 8/2010 Casazza ....................... 206/522

OTHER PUBLICATIONS

Amendment from counterpart U.S. Appl. No. 13/281,137 dated Jan. 25, 2012.
Specification dated Oct. 25, from U.S. Appl. No. 13/281,137.
Restriction/Election Requirement dated Nov. 28, 2011 from U.S. Appl. No. 13/281,137.
Response to Restriction/Election Requirement dated Dec. 28, 2011 from U.S. Appl. No. 13/281,137.
Office Action dated Jan. 18, 2012 from U.S. Appl. No. 13/281,137.
Amendment dated Jan. 25, 2012 from U.S. Appl. No. 13/281,137.
Notice of Allowance dates Feb. 7, 2012 from U.S. Appl. No. 13/281,137.
Specification dated Jun. 5, 2012 from U.S. Appl. No. 13/488,747.
Office Action dated Jul. 12, 2012 from U.S. Appl. No. 13/488,747.
Amendment dated Oct. 10, 2012 from U.S. Appl. No. 13/488,747.
Notice of Allowance dated Oct. 29, 2012 from U.S. Appl. No. 13/488,747.
Specification dated Apr. 8, 2009 from U.S. Appl. No. 12/480,356.
Office Action dated May 4, 2011 from U.S. Appl. No. 12/480,356.
Amendment dated Aug. 1, 2011 from U.S. Appl. No. 12/480,356.
Notice of Allowance dated Sep. 13, 2011 from U.S. Appl. No. 12/480,356.
Office Action dated Dec. 3, 2014 from Counterpart CN App. No. 201110314625.1.

\* cited by examiner

METHOD AND APPARATUS FOR TRANSPORTING WIND TURBINE BLADES

CROSS REFERENCE TO RELATED APPLICATIONS

This application is a Non-provisional Application of Provisional Application Ser. No. 61/393,404, filed 15 Oct. 2010, titled "Method and Apparatus for Transporting Wind Turbine Blades," which is hereby incorporated by reference for all purposes as if fully set forth herein.

BACKGROUND

1. Field of the Invention

The present invention relates generally to transportation systems, and more specifically to systems for transporting wind turbine blades.

2. Description of Related Art

Conventional wind turbines are rotary devices configured to extract energy from the wind. If the mechanical energy is converted to electricity, the wind turbine 100 may be called a wind generator, wind turbine, wind turbine generator, wind power unit, wind energy converter, or aerogenerator. Wind turbines used in wind farms for commercial production of electric power are usually three-bladed and are directed into the wind by computer-controlled motors. A tall tower base allows access to stronger wind in sites with wind shear. In some wind shear sites, wind speeds and corresponding power outputs can increase significantly for relatively small increases in elevation.

Figure 1:
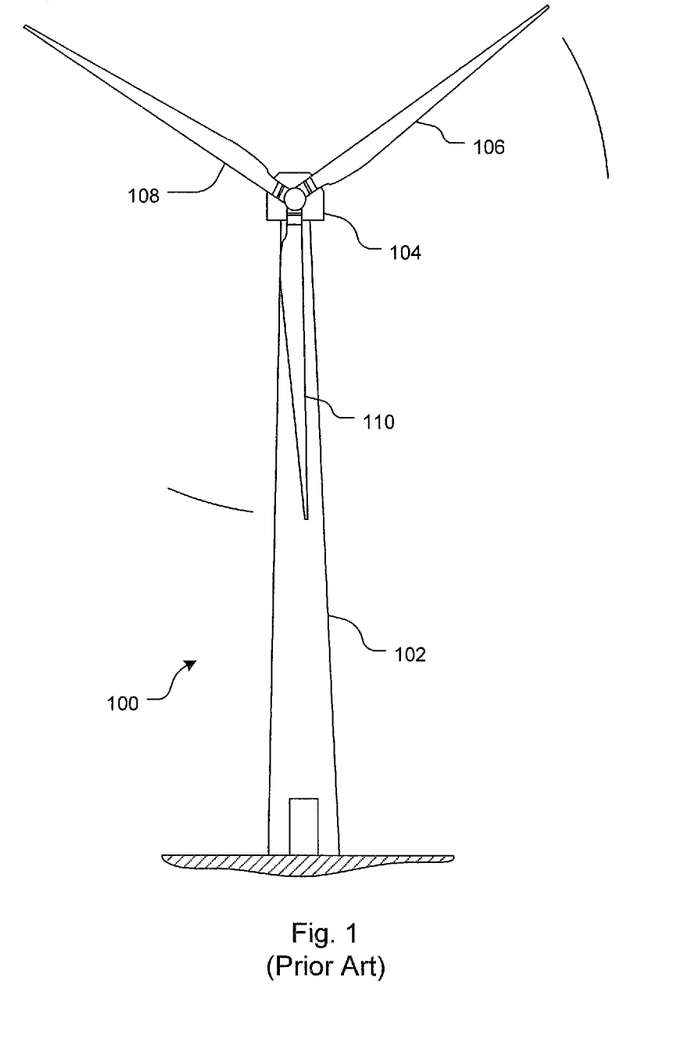
FIG. 1 is a front view of a conventional wind turbine.

Referring to FIG. 1 in the drawings, a conventional wind turbine 1001 is shown. Large wind turbines are typically disassembled into component parts prior to being carried on railcars, ships, trucks, and/or other vehicles. In the exemplary embodiment, wind turbine 100 comprises a tower 102, a nacelle 104, and three blades 106, 108, and 110. Unlike the tower and nacelle, the blades cannot be disassembled in smaller components for transportation. It should be understood that the blades can exceed 160 feet in length and have a 12 feet chord length. Transporting the blades can create significant problems.

Although significant strides have been made in the area of transporting wind turbine blades, many shortcomings remain.

DESCRIPTION OF THE DRAWINGS

The novel features believed characteristic of the invention are set forth in the appended claims. However, the invention itself, as well as a preferred mode of use, and further objectives and advantages thereof, will best be understood by reference to the following detailed description when read in conjunction with the accompanying drawings, wherein:

While the assembly and method of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the process of the present application as defined by the appended claims.

DETAILED DESCRIPTION OF THE PREFERRED EMBODIMENT

In the interest of clarity, not all features of an actual implementation are described in this specification. It will of course be appreciated that in the development of any such actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

Figure 2:
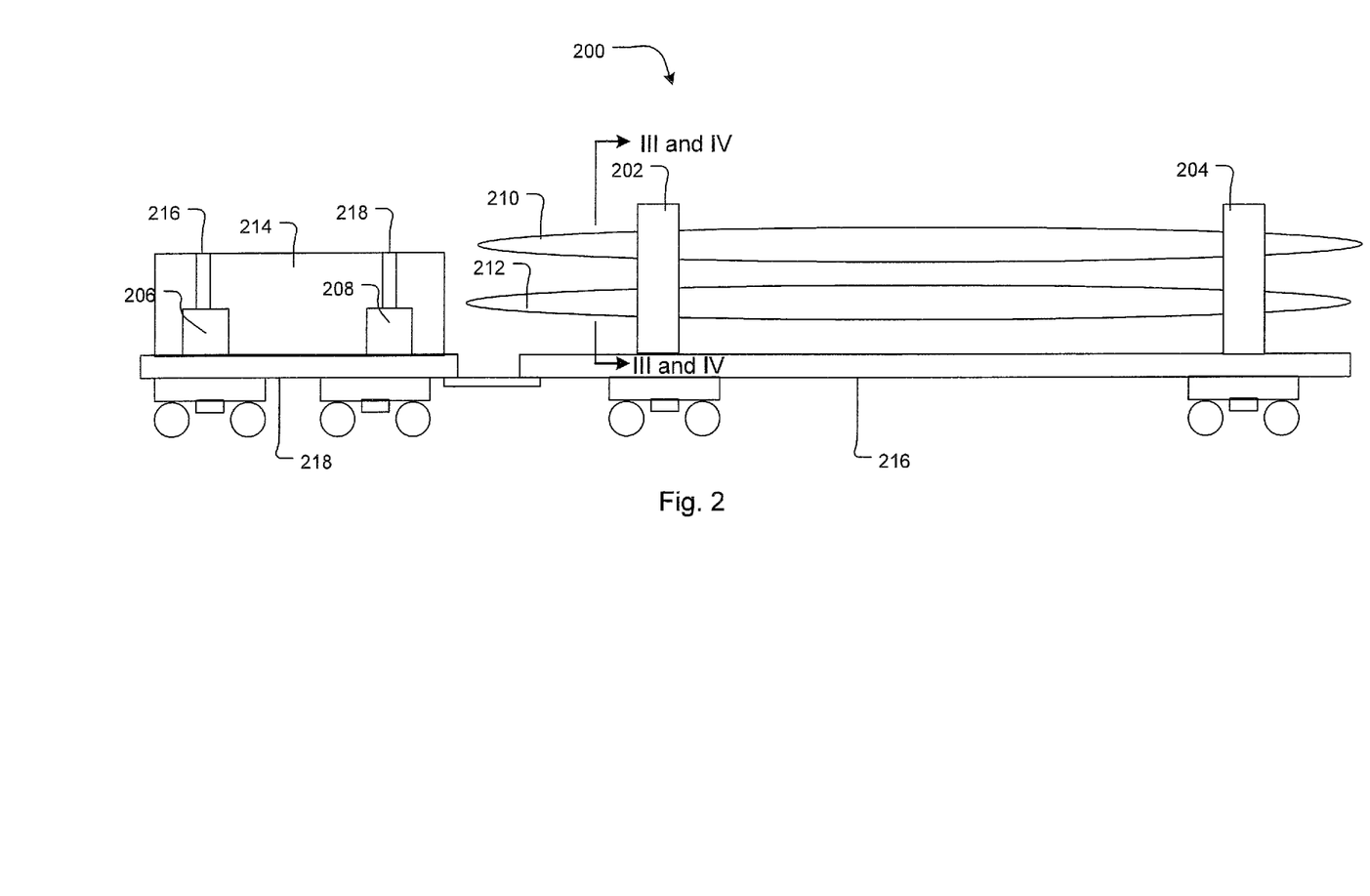
FIG. 2 is a side view of a system for transporting wind turbine blades according to the present application.

Referring to FIG. 2 in the drawings, a side view of a system 200 for transporting wind turbine blades is illustrated. System 200 includes frame assemblies 202-208. Frame assemblies 202 and 204 retain turbine blades 210 and 212, while frame assemblies 206 and 208 retain tower section 214. Frame assemblies 206 and 208 may use retainers 216 and 218, which may be straps 216 and 218, to retain tower section 214. System 200 may be used for transporting wind turbine blades 210 and 212, other components associated with wind turbine products, including tower section 214, or possibly any other component which would fit into system 200.

Frame assemblies 202-208 include inflatable devices for supporting and securing blades 210 and 212 and tower section 214. The inflatable devices are not shown in FIG. 2 because in some embodiments the inflatable devices do not extend beyond the side-view width, of frame assemblies 202-208, which may be four or five feet wide. Frame assemblies 202 and 204 may be coupled to railcar 216, a truck, a ship, or some other vehicle, with a wide variety of connectors and couplers, including quick-release connectors, twist-lock devices, and inter-box connectors (IBC's) (not shown). Frame assemblies 206 and 208 may be coupled to railcar 218, a truck, a ship, or some other vehicle, with twist-lock devices (also not shown). Frame assemblies 202-208 may be lifted as desired. For example, castings on the tops of frame assemblies 202 and 204 may enable frame assemblies 202 and 204 to be lifted by a machine that uses a spacer bar to prevent frame assemblies 202 and 204 from moving in a manner that may bend or damage turbines blades 210 and 212.

Figure 3:
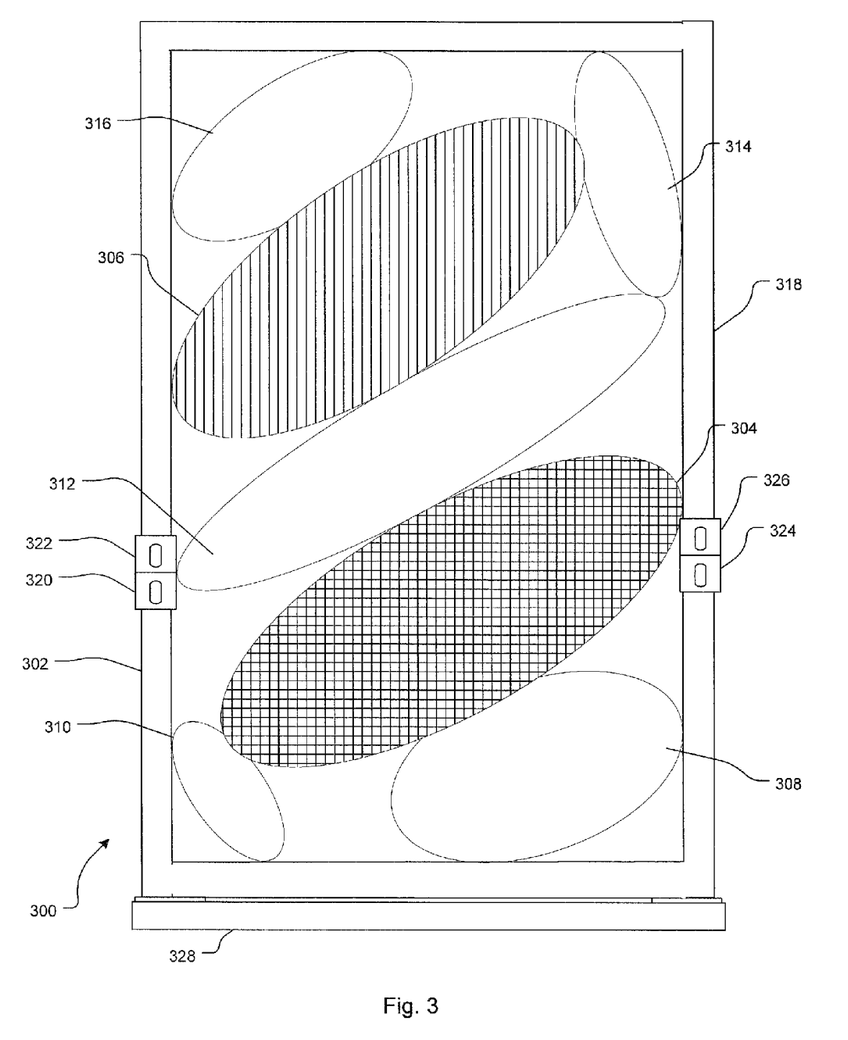
FIG. 3 is a cross-sectional end view of a frame assembly of the system of FIG. 2 taken at III-III.

Referring to FIG. 3 in the drawings, a cross-sectional end view of a frame assembly of FIG. 2 taken at III-III in FIG. 2 is illustrated. System 300 includes frame assembly 302, which may be referred to as bottom rack 302, for retaining blades 304 and 306. System 300 also includes inflatable devices 308-316, which may be referred to as air bags 308-316, for supporting and securing blades 304 and 306. System 300 may also include enclosure component 318, which may be referred to as top rack 318. Bottom rack 302 may be used without top rack 318 when an enclosure is not required, such as when transporting a tower section. For example, bottom rack 302 may be substantially similar to either of frame assemblies 206 and 208 in FIG. 2. Top rack 318 may be used with bottom rack 302 when required to complete an enclosure. For example, the combination of bottom rack 302 and top rack 318 may be substantially similar to either of frame assemblies 202 and 204 in FIG. 2. When racks 302 and 318 are connected to form an enclosure, the enclosure may be used as an intermodal device that would be acceptable for transportation in several different modes including railcars, truck, ships, and other vehicles. For example, the enclosure may be stacked on containers or other enclosures, and containers or other enclosures may be stacked on the enclosure. Although FIG. 2 depicts a frame enclosure formed by two rack components, racks 302 and 318, a frame enclosure may be formed by more than two rack components.

Racks 302 and 318 may be connected by connectors 320-326. For example, connectors 320-326 may be standard IBC's 320-326 and corner castings similar to those used to connect stacked containers in intermodal transportation. Although FIG. 3 depicts connectors 320-326 connecting racks 302 and 318 at a height that is approximately one-third from the bottom of the enclosure formed by racks 302 and 318, connectors 320-326 may connect racks 302 and 318 at any height, even at the top of the enclosure formed by racks 302 and 318. Furthermore, connectors 320 and 322 may connect racks 302 and 318 at a different height than the height where connectors 324 and 326 connect racks 302 and 318. In some embodiments, connectors 320 and 322 or connectors 324 and 326 may be a hinge. Connectors 320-326 enable the removal of top rack 318 from bottom rack 302 to permit overhead loading of components, such as blades 304 and 306, into bottom rack 302.

Inflatable devices 308-316, or air bags 308-316, may be attached to bottom rack 302 and/or top rack 318. Air bags 308-316 may be inflated to the proper pressure and size to secure the various shapes of components to be protected within frame assembly 302 or an enclosure. The shape of air bags 308-316 may be pre-formed to specific shapes when inflated. The shape of air bags 308-316 may also be variable when inflated, depending on requirements of the shape of the components to be secured within frame assembly 302 or an enclosure. Air bags 308-316 may be used as a self-sustaining protective "cradle" or "pillow" surrounding the particular shape of the components being secured for transportation movement. Air bags 308-316 may be inflatable to fit all sizes and shapes of blades and tower components. In one embodiment, differences in sizes and shapes of blades may be accommodated by the degree of inflation for air bags 308-316. Air bags 308-316 may provide sufficient pressure to properly restrain a blade, tower section, or other component while providing a flexible and safe means of cradling the components without the use of specific mechanical fasteners. Air bags 308-316 have more flexibility than mechanical fasteners to accept an array of different shapes and sized components.

Furthermore, inflatable devices 308-316 may be able to accept inflation from an outside source if leakage were to occur. For example, air could be provided by the air brake systems on trains, trucks, and other vehicles. Additionally, system 300 may also include an integral inflation source (not shown), which may enable inflation of inflatable devices 308-316 prior to loading inflatable devices 308-316 on a vehicle that provides an outside inflation source.

Bottom rack 302 may be coupled to support structure 328, which may be referred to as support plate 328, with a plurality of twist-lock devices (not shown), such as IBC's. Support plate 328 may be coupled to a railcar, such as railcars 216 and 218 in FIG. 2, a truck, a ship, or some other vehicle. Bottom rack 302, with or without top rack 318, may be lifted as desired.

Figure 4:
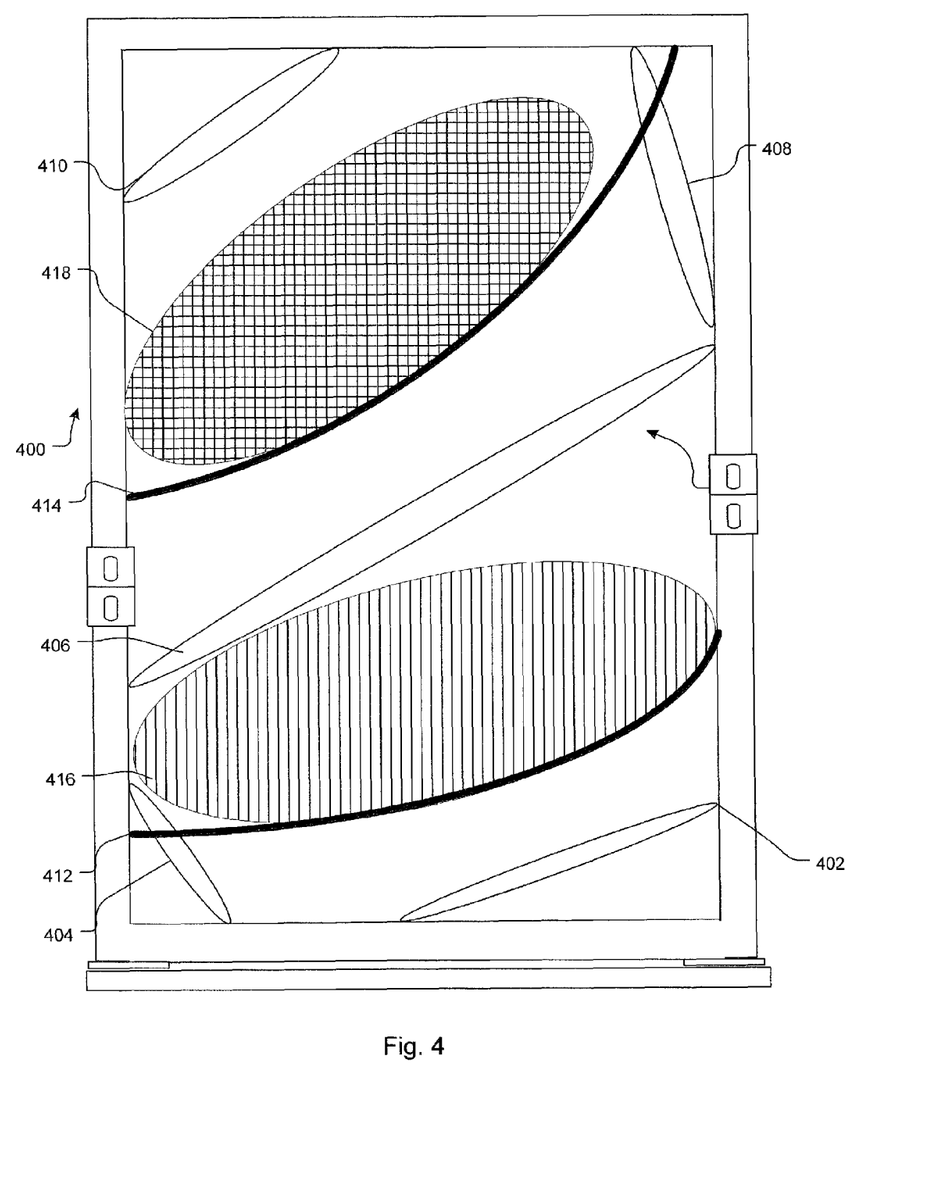
FIG. 4 is another cross-sectional end view of a frame assembly of the system of FIG. 2 taken at IV-IV.

Referring now to FIG. 4 in the drawings, a cross-sectional end view of a frame assembly of FIG. 2 taken at IV-IV in FIG. 2 is illustrated. System 400 includes deflated inflatable devices 402-410, which may be referred to as deflated air bags 402-410, instead of inflated inflatable devices, which may be referred to as inflated air bags. System 400 also includes flexible tension members 412 and 414 to support and restrain blades 416 and 418 prior to inflation of deflated air bags 402-410 and/or after deflation of air bags 402-410. Flexible tension members 412 and 414 are preferably KEVLAR belts or straps, but may be made of other composite materials or any of a wide variety of materials.

Figure 5:
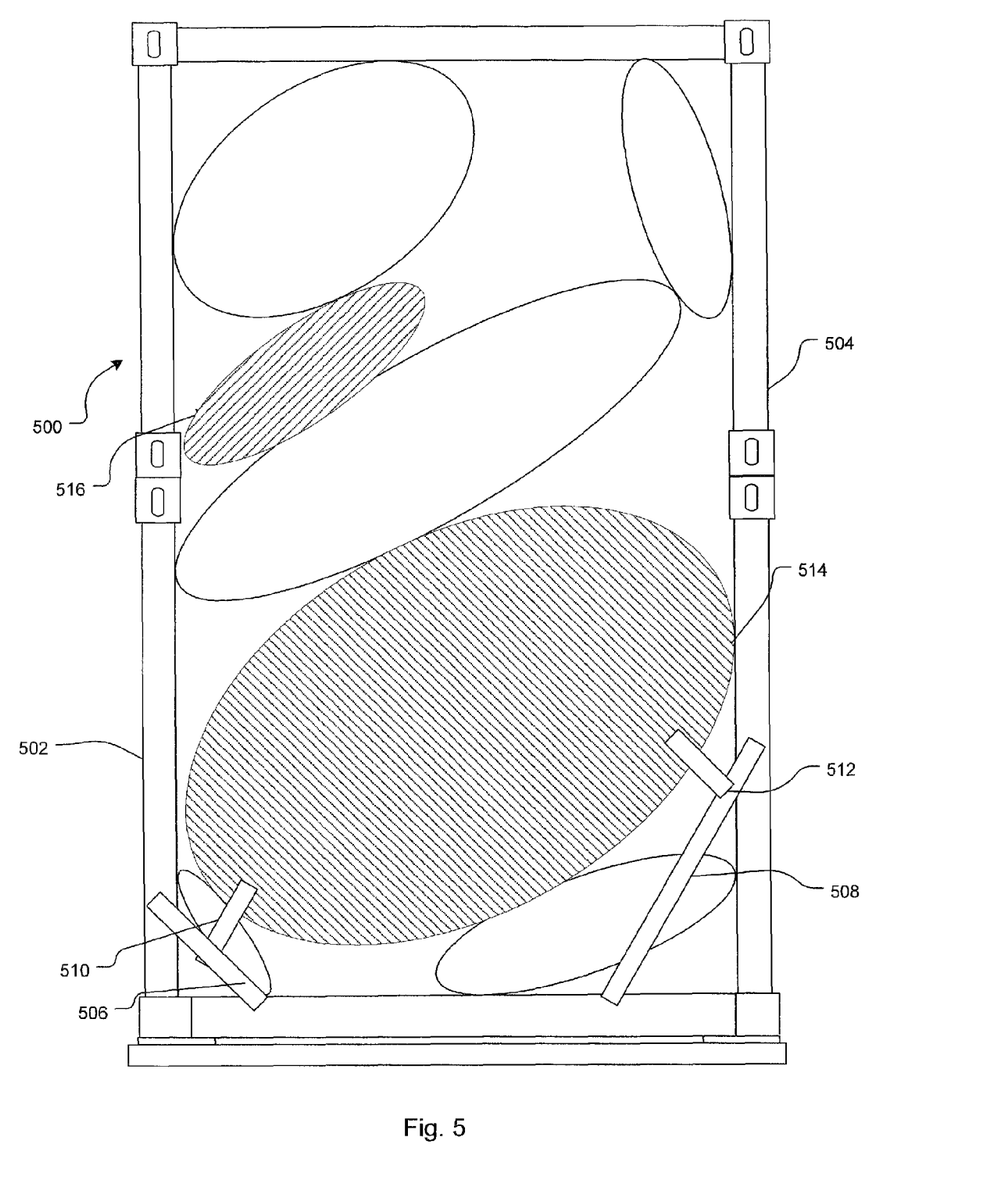
FIG. 5 is an end view of the frame assembly for the transportation system according to the present application.

Referring now to FIG. 5 in the drawings, an end view of a system 500 is illustrated according to an alternative embodiment of the present application. Racks 502 and/or 504 may have support brackets 506 and 508 to attach mechanical fasteners 510 and 512 to the end of blade 514, or other components, possibly using existing bolt holes in the end of blade 514, or other components. Brackets 506 and 508 and/or mechanical fasteners 510 and 512 may include some form of suspension system, such as springs or shock absorbers, to dampen the impact of transport on blade 514.

Figure 6:
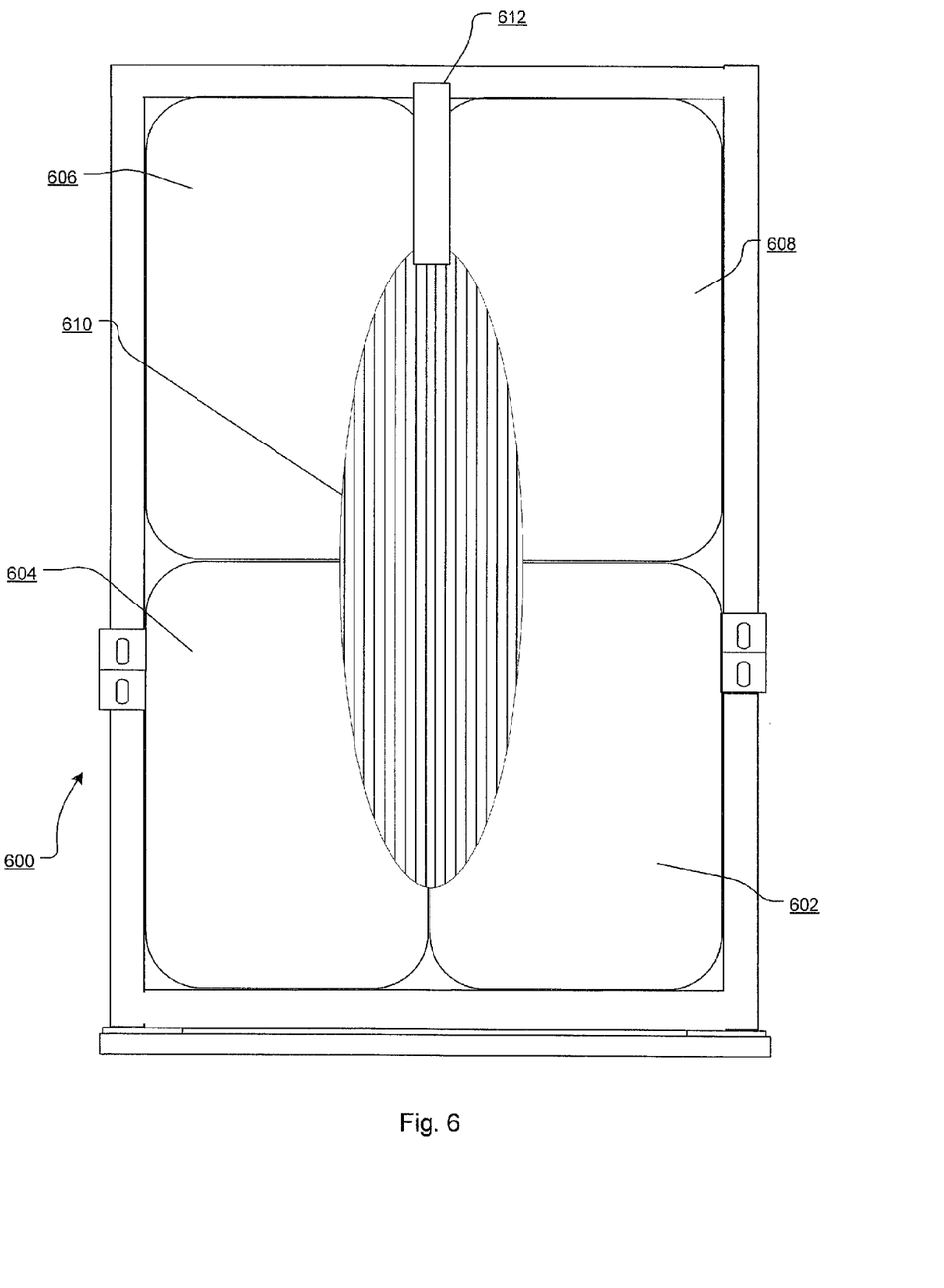
FIG. 6 is another end view of the frame assembly for the transportation system according to the present application.

Referring now to FIG. 6 in the drawings, an end view of a system 600 is illustrated according to an alternative embodiment of the present application. System 600 includes inflatable devices 602-608, which may be referred to as air bags 602-608, that inflate to conform to blade 610 to support and secure blade 610. System 600 may also include bracket and/or mechanical fastener 612 to support blade 610 prior to inflation of inflatable devices 602-608 and after deflation of inflatable devices 602-608. Bracket and/or mechanical fastener 612 may include some form of suspension system, such as springs or shock absorbers, to dampen the impact of transport on blade 610.

A method for transporting blades 106 is now described. At a transportation point of origin, blades 304 and 306 are attached to frame assembly 302. Blades 416 and 418 may be supported with flexible tension members 412 and 414. Deflated inflatable devices 402-410 are inflated to become inflatable devices 308-316 supporting a portion of blades 304 and 306. For additional support, mechanical fasteners 510 and 512 may be attached to an end of blade 514 via support brackets 506 and 508. Enclosure component 318 may be attached to frame assembly 302 to form an enclosure. Frame assembly 302 is attached to support structure 328, and support structure 328 is coupled to a mode of transportation, such as a railcar, a truck, a ship, or another vehicle. At this step in the method, a turbine blade is securely supported and ready for transportation.

During transport of a turbine blade, a determination may be made whether leakage has occurred for the inflatable devices. If leakage has occurred, the inflatable devices may be re-inflated from a source associated with the mode of transportation, such as from the air brakes for a truck or a railcar, or from an integral source of inflation.

At a transportation point of destination, steps that correspond to the steps performed at the transportation point of origin may be performed in a reverse order. Frame assembly 302 is detached from support structure 328. Enclosure component 318 is detached from frame assembly 302. Mechanical fasteners 510 and 512 attached to support brackets 506 and 508 are detached from an end of blade 514.

Inflatable devices 308-316 are deflated to become deflated inflatable devices 402-410. Blades 416 and 418 are lifted from flexible tension members 412 and 414. Of course, the steps in the method may be performed in a different order. Although systems and methods have been described with respect to transporting large wind turbine blades, it should be understood that the systems and the methods may be used to transport other lengthy objects, such as highway overpass beams.

It is evident by the foregoing description that the subject application has significant benefits and advantages, including: (1) air bags enable one system to be used for different sizes of components; (2) air bags easily conform to different shaped components; (3) air bags can be used in many modes of transportation; (4) air bags reduce costs required for the redesigning of shipping components when blade designs change; (5) air bags offer better protection of transported components; and (6) air bags enable simple installation and removal processes for components.

The particular embodiments disclosed above are illustrative only, as the invention may be modified and practiced in different but equivalent manners apparent to those skilled in the art having the benefit of the teachings herein. It is therefore evident that the particular embodiments disclosed above may be altered or modified, and all such variations are considered within the scope and spirit of the invention. Accordingly, the protection sought herein is as set forth in the description. Although the present invention is shown in a limited number of forms, it is not limited to just these forms, but is amenable to various changes and modifications without departing from the spirit thereof.

What is claimed is:

1. A system for transporting a set of one or more wind turbine blades, comprising:
    a frame assembly that forms an interior area that in turn retains the set of one or more wind turbine blades therein, the frame, having:
        a top rack having side members integral with a bottom member and configured to form a U-shaped structure; and
        a bottom rack having side members integral with a bottom member and configured to form a U-shaped structure;
    wherein the side members of the top rack are releasably attached to the side members of the bottom rack via a plurality of connectors positioned at a plurality of ends of the side members of the bottom rack and the side members of the top rack;
    wherein, when assembled, the top rack and the bottom rack form a rigid enclosed structure for carrying the set of one or more turbine blades within the interior area;
    a support bracket secured to the bottom rack;
    a mechanical fastener removably secured to the support bracket and configured to directly attach an end of one of the one or more turbine blades to the support bracket;
    a plurality of inflatable devices disposed within the interior area and coupled to the frame assembly, the plurality of inflatable devices being inflated to support a portion of the one or more wind turbine blades and the plurality of inflatable devices are pre-formed to the specific contouring of the one or more wind turbine blades when the plurality of inflatable devices are inflated; and
    a flexible tension member positioned within the interior area and configured to support and retain the set of one or more wind turbine blades;
    wherein the combination of the plurality of inflatable devices and flexible tension member support and retain the set of one of more wind turbine blades in a relatively fixed position during transport.

2. The system according to claim 1, wherein the frame assembly is configured for releasable attachment to a support structure, and wherein the support structure is coupled to a mode of transportation.

3. The system according to claim 1, further comprising:
    an enclosure component that is configured for releasable attachment to the frame assembly to form an enclosure.

4. The system according to claim 3, wherein the enclosure is configured to be stacked with another enclosure.

5. The system according to claim 3, wherein the enclosure component is releasably attached to the frame assembly by one or more quick-release devices.

6. The system according to claim 5, wherein the one or more quick-release devices comprises:
    at least one of a bayonet-type twist-lock device and an inter-box connector.

7. The system according to claim 1, wherein the plurality of inflatable devices comprise:
    a plurality of air bags.

8. The system according to claim 1, wherein a shape of at least one of the plurality of inflatable devices conforms to a shape of a specific portion of at least one of the one or more wind turbine blades when the at least one of the plurality of inflatable devices is inflated.

9. The system according to claim 8, wherein a degree of inflation associated with the at least one of the plurality of inflatable devices determines a degree of conformity to the shape of the specific portion of the at least one of the one or more wind turbine blades when the at least one of the plurality of inflatable devices is inflated.

10. The system according to claim 1, wherein the flexible tension member comprises:
    at least one KEVLAR belt.

* * * * *